United States Patent [19]

Talaski

[11] Patent Number: 5,421,306
[45] Date of Patent: Jun. 6, 1995

[54] CHECK VALVE FOR ENGINE FUEL DELIVERY SYSTEMS

[75] Inventor: Edward J. Talaski, Caro, Mich.

[73] Assignee: Walbro Corporation, Cass City, Mich.

[21] Appl. No.: 206,170

[22] Filed: Mar. 7, 1994

[51] Int. Cl.⁶ .................. F16K 15/02; F02M 37/10
[52] U.S. Cl. .................. 123/510; 137/542; 123/457
[58] Field of Search .............. 123/457, 460, 510, 506; 137/542

[56] References Cited

U.S. PATENT DOCUMENTS

| | | | |
|---|---|---|---|
| 2,909,192 | 10/1959 | Dobrick | 137/542 |
| 2,960,998 | 11/1960 | Sinker et al. | 137/542 |
| 3,580,275 | 5/1971 | Hanson et al. | 137/516.29 |
| 3,756,273 | 9/1973 | Hengesbach | 137/542 |
| 3,945,396 | 3/1976 | Hengesbach | 137/542 |
| 4,271,862 | 6/1981 | Snoek | 137/542 |
| 4,537,384 | 8/1985 | Petersen et al. | 137/542 |
| 4,539,959 | 9/1985 | Williams | 123/457 |
| 4,697,995 | 10/1987 | Tuckey | 418/15 |
| 4,813,452 | 3/1989 | Smith | 137/542 |
| 5,004,009 | 5/1991 | Bunce | 137/541 |
| 5,148,792 | 9/1992 | Tuckey | 123/497 |
| 5,196,493 | 3/1993 | Re | 123/510 |
| 5,289,810 | 3/1994 | Bauer et al. | 123/510 |

FOREIGN PATENT DOCUMENTS 2415298 2/1981 Germany .
1528120 3/1975 United Kingdom .

Primary Examiner—Tony M. Argenbright
Assistant Examiner—Thomas N. Moulis
Attorney, Agent, or Firm—Barnes, Kisselle, Raisch, Choate, Whittemore & Hulbert

[57] ABSTRACT

In a fuel delivery system that includes a pump for supplying fuel under pressure from a supply to an internal combustion engine and a pressure regulator for returning excess fuel from the engine to the supply, a check valve is positioned between the pump and the engine for preventing back-flow of fuel from the engine to the pump. The valve has a flow passage with a central axis and a valve seat orientated away from the pump. A valve element is positioned within the passage for axial motion against a coil spring as a function of fuel flow from the pump. A first portion of passage surrounding the valve element has a cross section to fluid flow that increases substantially monotonically from the seat for an axial distance that at least corresponds to maximum travel of the valve element against the spring. A substantially cylindrical second portion of the valve passage is positioned adjacent to the first portion and surrounds the valve element, and the valve element is slidably retained in a keeper within the cylindrical portion of the passage. Thus, axial and lateral motions of the valve element are stabilized, greatly reducing pressure pulses delivered from the pump to the engine.

16 Claims, 2 Drawing Sheets

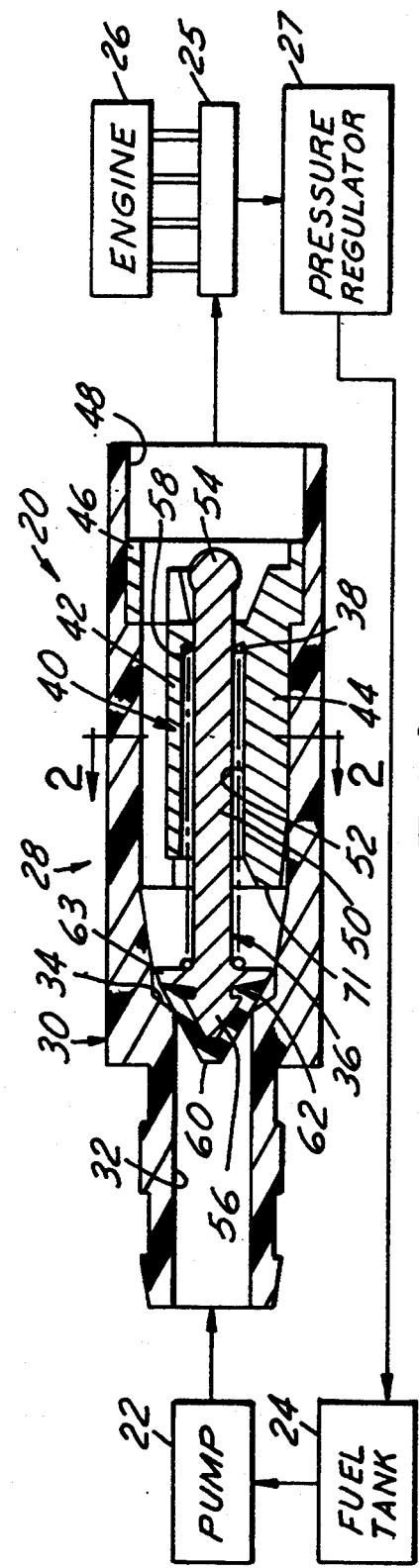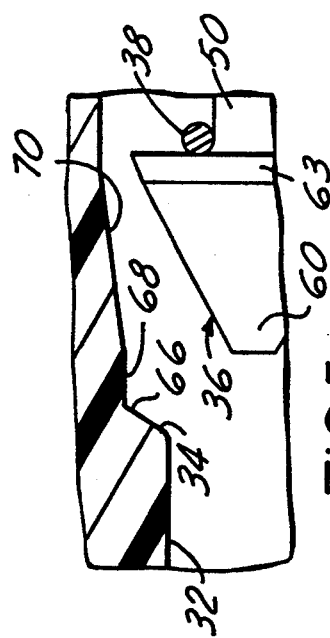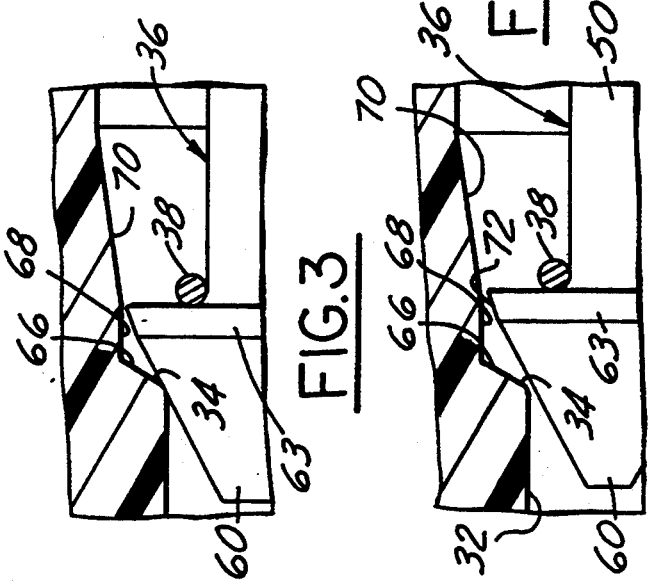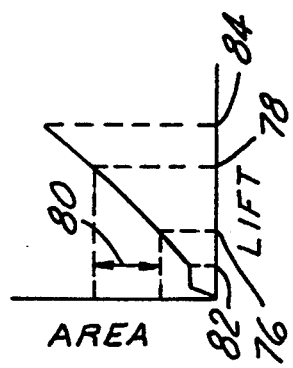

CHECK VALVE FOR ENGINE FUEL DELIVERY SYSTEMS

The present invention is directed to fuel delivery systems for internal combustion engines, and more particularly to an improved check valve for disposition between the fuel pump and the engine.

BACKGROUND AND OBJECTS OF THE INVENTION

Fuel delivery systems of the subject character typically include a pump for delivering fuel under pressure from a supply to a fuel consumer, such as an internal combustion engine. Excess fuel at the engine is returned to the supply tank through a pressure regulator. A check valve is connected between the pump and the engine for preventing back-flow of fuel from the engine to the pump when the pump is turned off. Fuel pressure is thereby maintained at the engine, resulting in reduced start-up time. Typically, the check valve includes a valve element biased by a spring against a seat within a fuel passage. That portion of the passage extending from the seat surrounding the valve element is of uniform cylindrical contour so that, after lift of the valve element from the seat, cross sectional area to fluid flow between the valve element and the surrounding wall remains substantially constant and independent of valve lift. U.S. Pat. No. 4,697,995 discloses a check valve of the described construction carried by the housing of a fuel pump, and thus constructed as a unitary assembly with the pump.

Although fuel delivery systems of the described character, as illustrated in the noted U.S. Patent, have enjoyed substantial commercial acceptance and success, improvements remain desirable. For example, positive displacement fuel pumps conventionally employed in automotive engine fuel delivery systems typically are of construction that deliver intermittent fuel flow and/or pressure pulses over and above a constant or average level. These pulsations affect engine operation and can cause noise in the vehicle, and reduction or elimination thereof is desirable. Further, since cross sectional area to fluid flow in prior art check valves of the subject character is substantially independent of valve position, there is a marked tendency for the valve element to oscillate around an average position, thus exacerbating rather than reducing the problem of pressure and flow pulses in the pump output.

A general object of the present invention, therefore, is to provide a check valve that finds particular utility in fuel delivery systems of the subject character, but also enjoys wide application in other flow control environments of similar nature, and that helps reduce or eliminate pressure and flow pulses in the fuel delivery line. Another and more specific object of the invention is to provide a check valve of the described character that exhibits a cross sectional area to fluid flow that increases continuously or substantially continuously, preferably substantially linearly, with fluid pressure and corresponding motion of the valve element against the force of the return spring.

SUMMARY OF THE INVENTION

A check valve in accordance with a presently preferred embodiment of the invention comprises a valve element, a fluid flow passage surrounding the valve element and having an internal valve seat opposed to the valve element, and a spring positioned within the passage for urging the valve element against the seat. The fluid passage internal wall surface extending downstream from the valve seat is contoured to cooperate with the valve element such that cross sectional area to fluid flow through the passage surrounding the valve element increases substantially continuously with motion of the valve element within the passage for substantially the entire range of motion of the element within the passage. Preferably, the fluid passage wall surface downstream of the valve seat lies on a continuous surface of revolution that surrounds the central axis of the passage. Diameter of the fluid passage wall surface portion that surrounds the valve element increases substantially monotonically from the valve seat for an axial distance that substantially corresponds to maximum travel of the valve element against the spring.

In a fuel delivery system that includes a pump for supplying fuel under pressure from a supply to an internal combustion engine in a preferred implementation of the present invention, the check valve is positioned between the pump and the engine for preventing back-flow of fuel from the engine to the pump. Excess fuel at the engine is returned to the supply through a pressure regulator, which also controls pump operating pressure. The valve has a flow passage with a central axis and a valve seat orientated away from the pump. The valve element is positioned within the passage for axial motion against a coil spring as a function of fuel flow from the pump. A first small portion of the passage surrounding the valve element immediately adjacent to the valve seat is substantially cylindrical. A second portion of the wall surface that surrounds the valve element for a major portion of its travel has a cross section to fluid flow that increases substantially monotonically, preferably conically, from the seat for an axial distance that at least corresponds to travel of the valve element against the spring within the limited flow range required at the valve. A substantially cylindrical third portion of the valve passage is positioned adjacent to the second portion and surrounds the valve element, and the valve element is slidably disposed in a keeper in this cylindrical third portion of the passage.

The valve element in the preferred embodiments of the invention has a conical valve head so that, at any position of the valve element within the passage, the cross section area to fluid flow—i.e., the radial separation between the valve head and the surrounding passage surface—decreases uniformly in the direction of fluid flow. This construction makes the valve element essentially self-centering during operation. Thus, axial and lateral motions of the valve element are stabilized in the preferred implementation of the invention, greatly reducing pressure pulses delivered from the pump to the engine. The valve element may be of plastic or brass construction or may be of stainless steel construction in alternate fuel applications. The valve head comprises a hollow rubber cone insert molded or snapped onto the valve element.

BRIEF DESCRIPTION OF THE DRAWINGS

The invention, together with additional objects, features and advantages thereof, will be best understood from the following description, the appended claims and the accompanying drawings in which:

FIG. 1 is a partially schematic and partially sectional view in side elevation of a fuel delivery system that includes a check valve in accordance with one presently preferred embodiment of the invention;

FIG. 2 is a sectional view taken substantially along the line 2—2 in FIG. 1;

FIGS. 3–5 are fragmentary sectional views on an enlarged scale that illustrate operation of the check valve in FIG. 1;

FIG. 6 is a graph useful in discussing operation of the check valve in accordance with the invention;

DETAILED DESCRIPTION OF PREFERRED EMBODIMENT

Figure 7:
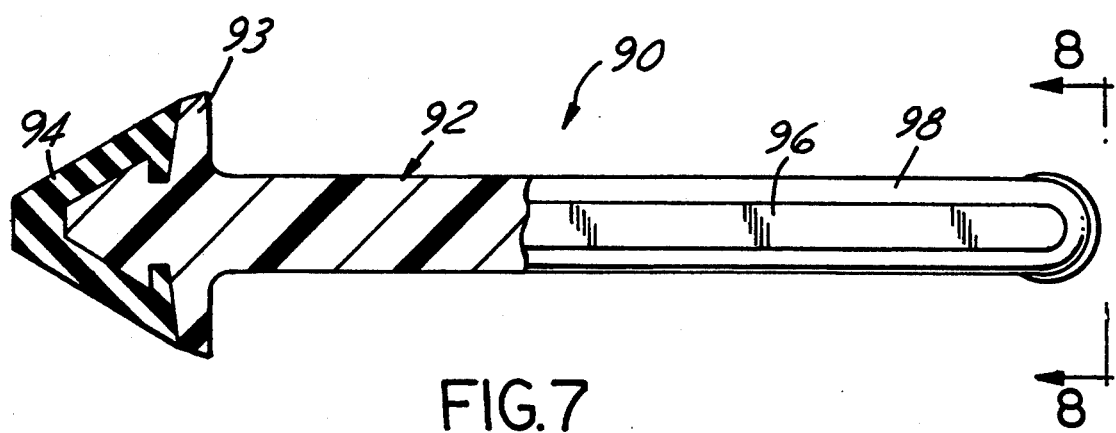
FIG. 7 is a partially sectioned elevational view of a valve element in accordance with a modified embodiment of the invention.

FIG. 1 illustrates a fuel delivery system 20 in accordance with one presently preferred embodiment of the invention as comprising a fuel pump 22 for delivering fuel under pressure from a supply or tank 24 to a fuel rail 25 coupled to a fuel consumer 26, such as an internal combustion engine. A check valve 28 is connected in the fuel line between pump 22 and rail 25 for permitting free flow of fuel from the pump to the fuel rail, but preventing back-flow of fuel from the rail to the pump when the pump is shut off. Excess fuel at rail 25 is returned to tank 24 by a pressure regulator 27. In general, valve 28 includes a sleeve or fitting 30 having an internal passage 32 formed with a valve seat 34. A valve element 36 is positioned within passage 32 downstream of seat 34 with respect to the direction of fuel flow from pump 22 to engine 26. A coil spring 38 is captured in compression between valve element 36 and a keeper 40 within passage 32 for urging valve element 36 against valve seat 34. Flow of fuel from pump 22 urges valve element 36 to the right in FIG. 1 against the force of spring 38, and thereby lifts the valve element from the valve seat to permit passage of fuel therepast.

Keeper 40 includes a central sleeve 42 with radially extending ribs 44 that engage passage 32 downstream of seat 34. The enlarged end 46 of keeper 40 is press fitted into a counterbore 48 at the seat-remote end of fitting 30. Valve element 36 has an elongated stem 50 that extends through the internal passage 52 of keeper 40, being retained therein by the enlargement 54 at the end of stem 50. Coil spring 38 surrounds stem 50 and is captured between the head 56 of valve element 36 and the internal shoulder 58 of keeper 40. A resilient conical cap 60 of rubber or other suitable construction has an inward lip 62 that is received in an annular groove on head 56 to retain cap 60 on head 56. Passage 32 includes a conical portion 66 that forms seat 34. A small substantially cylindrical portion 68 surrounds head 56 and is contiguous with portion 66. A conical surface 70 opens downstream of surface portion 68 coaxially with valve element 36. The axial face 71 of keeper 40 forms an axial stop for valve head 56 to limit motion thereof against spring 58. Axial dimension of surface portion 70 is coordinated with travel of valve element 36 within fitting 30 so that cross sectional area to fluid flow within passage 32 around valve element 36 increases continuously substantially throughout travel of element 36 within fitting 30.

FIG. 3 is a fragmentary view on an enlarged scale of a portion of valve 28 in FIG. 1 showing valve element 36 seated by spring 38 against valve seat 34. As flow of fuel from pump 22 (FIG. 1) increases, valve element 36 is initially lifted from seat 34 against the spring force to provide a minimum annular area 72 (FIG. 4) for fluid flow between valve element 36 and surface portion 68. As fuel flow continues to increase, and as element 36 continues to lift from seat 34 against the spring force, the conical contour of surface portion 70 provides an increasing separation between the surface and the opposing edge of valve element 36, and thus a continuously increasing annular area for fluid flow between the valve element and the surrounding surface. Such fluid flow area continues to increase with valve element motion or lift at least substantially to the limit of travel of the valve element, at which point (FIG. 5) maximum separation 74 provides maximum annular area for fluid flow between the valve element and the surrounding passage wall surface.

FIG. 6 illustrates the lift v. flow characteristics for the valve 28 of FIGS. 1–5. In conjunction with pressure regulator 27, valve 28 is designed to yield a substantially linear flow characteristic over a design operating range between a minimum lift (FIG. 4) and a maximum lift (FIG. 5). Overall design flow range accommodates variability of pump 22 (FIG. 1), pressure regulator 27, fuel temperature and pumps drive voltage. Under normal operating conditions, lift would be expected to fluctuate between the points 76,78 as a function of engine demand, corresponding to a normal flow area range 80. Minimum expected lift 82 may occur under low voltage or hot fuel conditions, while maximum expected lift 84 may occur at high voltage or cold fuel conditions, for example. It is important to note that valve 28 does not fluctuate between open and closed positions within the design operation range. This helps present extremes of flow and pressure pulsations. The operating conditions of FIGS. 4 and 5 thus correspond to minimum and maximum fluid flow conditions, and dimensions of valve 28 are selected in correspondence with actual fluid flow requirements at these stages.

It will also be recognized in FIGS. 1 and 3–5 that conical cap 60 cooperates with the outer edge of valve element flange 63 to form a substantially conical valve element surface opposed to fuel flow. That is, the outer diameter of flange 63 is contoured essentially to continue the conical surface of cap 60. Preferably the conical outer diameter of flange 63 is at a slightly lesser angle to the axis than the outer surface of cap 60. It will thus be seen in FIG. 5 that the cross sectional area to fluid flow—i.e., the radial spacing between surface 70 and cap 56/flange 63 decreases uniformly in the direction of fluid flow for any given position of the valve element to a minimum area at the plane of flange 63. This construction makes valve element 36 essentially self-centering within passage 32, essentially eliminating valve noise due to radial motion and vibration at the valve head.

Figures 8, 9:
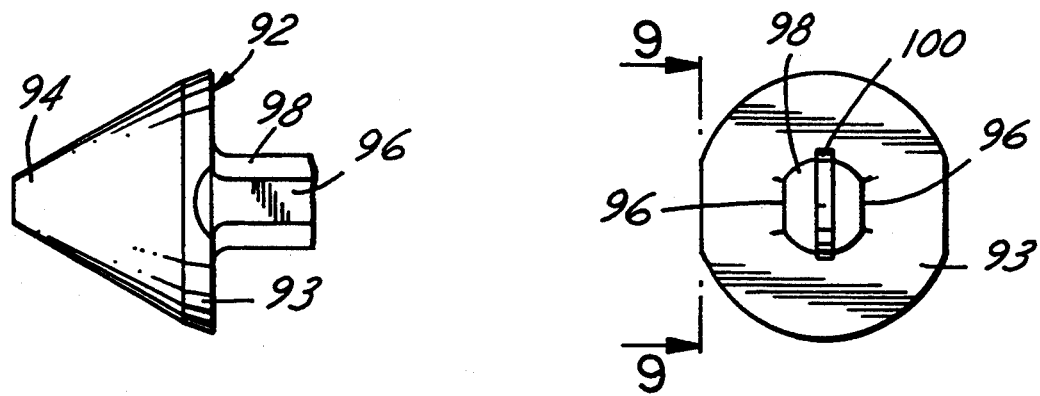
FIGS. 8 and 9 are fragmentary views taken substantially along the lines 8—8 and 9—9 in FIGS. 7 and 8 respectively.

In the embodiment of FIGS. 1–5, the body of valve element 36 is of brass construction, or of stainless steel construction for alternate fuel applications. FIGS. 7–9 illustrate a modified valve element 90, in which the body 92 is of plastic composition and cap 94 is insert molded onto body 92 adjacent to flange 93. Body 92 has flats 96 on the opposed sides of stem 98, and an enlargement 100 is formed by a rib for retaining the valve element in keeper 40 (FIGS. 1–2). Flats 96 help reduce the likelihood of valve malfunction due to flash from the molding process.

I claim:

1. A fuel delivery system for an internal combustion engine that includes a fuel supply, a fuel pump for delivering fuel under pressure from the supply to the engine, and a check valve between the pump and the engine for preventing back-flow of fuel from the engine to the pump, said check valve comprising a valve element having an area of maximum diameter, means defining a flow passage surrounding said element including a valve seat axially opposed to said element and a passage wall radially surrounding said area of maximum diameter of said valve element, and spring means for urging said element against said seat, motion of said valve element off of said seat against said spring means being a function of fuel flow from said pump, characterized in that said passage wall has an internal contour radially surrounding said valve element that is constructed such that radial cross sectional area to fuel flow between said area of maximum diameter of said valve element and said passage wall increases substantially continuously throughout at least a major portion of motion of said element within said passage away from said seat.

2. The system set forth in claim 1 wherein said valve further includes stop means defining a limit for motion of said valve element against said spring, said passage being contoured such that said radial cross section to fuel flow increases substantially to said limit of motion.

3. The system set forth in claim 2 wherein said passage has a diameter that increases continuously substantially from said seat to a position surrounding said valve element at said limit.

4. The system set forth in claim 3 wherein said internal contour is of conical construction.

5. The system set forth in claim 4 wherein said valve element has a valve head opposed to said seat, said valve head having a radially outer surface of conical construction substantially throughout its length, such that said valve head is self-centering within said passage essentially eliminating noise due to radial vibration of said head within said passage.

6. The system set forth in claim 5 in which said valve head is positioned axially within said passage to eliminate noise due to axial vibration of said head within said passage.

7. The system set forth in claim 6 in which said valve head is positioned axially within said passage to eliminate noise due to vibration of said head against said seat.

8. The system set forth in claim 5 wherein said valve element comprises an elongated stem having a flange at one end, said head comprising a resilient cap mounted on said element adjacent to said flange, said cap having a conical outer surface and said flange having an outer diameter that continues said conical outer surface, maximum diameter of said head being defined by the outer diameter of said flange.

9. The system set forth in claim 3 wherein said check valve further includes a keeper received in said passage for limiting axial and lateral motion of said valve element.

10. The system set forth in claim 9 wherein said valve element includes a valve stem that slidably extends through said keeper, said spring means comprising a coil spring surrounding said stem and being captured between said valve element and said keeper.

11. The system set forth in claim 10 wherein said valve element includes a resilient cap for engaging said seat.

12. The fuel delivery system set forth in claim 1 further comprising a pressure regulator coupled to said engine for returning excess fuel to said supply when fuel pressure at said engine exceeds a predetermined pressure, and wherein said valve is constructed to supply fuel to said engine at a flow rate that varies substantially linearly as a function of motion of said valve element between a minimum design flow rate greater than zero and a maximum design flow rate.

13. A fuel delivery system for an internal combustion engine that includes a fuel supply, a fuel pump for delivering fuel under pressure from the supply to the engine, and a check valve between the pump and the engine for preventing back-flow of fuel from the engine to the pump, said check valve comprising a valve element, means defining a flow passage surrounding said element including a valve seat opposed to said element, and spring means for urging said element against said seat, motion of said valve element off of said seat against said spring means being a function of fuel flow from said pump, said passage having a conical internal contour surrounding said valve element that is constructed such that cross sectional area to fuel flow increases substantially monotonically with motion of said element against said spring means throughout at least a major portion of motion of said element within said passage, said valve further including stop means defining a limit for motion of said valve element against said spring, said passage having a diameter that increases continuously substantially from said seat to a position surrounding said valve element at said limit and being contoured such that said cross section to fuel flow increases substantially to said limit of motion, said valve element having a valve head opposed to said seat, said valve head having a radially outer surface of conical construction substantially throughout its length, such that said valve head is self-centering within said passage essentially eliminating noise due to radial vibration of said head within said passage, said valve element comprising an elongated stem having a flange at one end, said head comprising a resilient cap mounted on said element adjacent to said flange, said cap having a conical outer surface and said flange having an outer diameter that continues said conical outer surface, maximum diameter of said head being defined by the outer diameter of said flange.

14. A fuel delivery system for an internal combustion engine that includes a fuel supply, a fuel pump for delivering fuel under pressure from the supply to the engine, and a check valve between the pump and the engine for preventing back-flow of fuel from the engine to the pump, said check valve comprising a valve element, means defining a flow passage surrounding said element including a valve seat opposed to said element, and spring means for urging said element against said seat, motion of said valve element off of said seat against said spring means being a function of fuel flow from said pump, said passage having an internal contour surrounding said valve element that is constructed such that cross sectional area to fuel flow increases substantially monotonically with motion of said element against said spring means throughout at least a major portion of motion of said element within said passage, said valve further including stop means defining a limit for motion of said valve element against said spring, said passage having a diameter that increases continuously substantially from said seat to a position surrounding said valve element at said limit and being contoured such that said cross section to fuel flow increases substantially to said limit of motion, said check valve further including a keeper received in said passage for limiting axial and lateral motion of said valve element, said valve element including a resilient cap for engaging said seat and a valve stem that slidably extends through said keeper, said spring means comprising a coil spring surrounding said stem and being captured between said valve element and said keeper.

15. A fluid check valve that comprises a valve element, a fluid passage surrounding said element and having an internal valve seat opposed to said element, and spring means positioned within said passage for urging said element against said seat, said passage having a first portion with a conical internal contour surrounding said valve element that cooperates with said valve element such that cross sectional area to fluid flow increases substantially continuously with motion of said element within said passage for substantially the entire range of motion of said element within said passage, at least said seat and said first portion lying on a continuous surface of revolution surrounding a central axis, said valve element having a valve head opposed to said seat, said valve head having a radially outer surface of conical construction substantially throughout its length, such that said valve head is self-centering within said passage essentially eliminating noise due to radial vibration of said head within said passage, said valve element comprising an elongated stem having a flange at one end, said head comprising a resilient cap mounted on said element adjacent to said flange, said cap having a conical outer surface and said flange having an outer diameter that continues said conical outer surface, maximum diameter of said head being defined by the outer diameter of said flange.

16. The valve set forth in claim 15 wherein said passage includes a substantially cylindrical second portion adjacent to said first portion and surrounding said valve element, and a keeper received in said second portion in which said valve element is slidably disposed.

* * * * *